INVENTOR.
Howard M. Geyer

INVENTOR.
Howard M. Geyer

His Attorney

United States Patent Office 3,080,852
Patented Mar. 12, 1963

3,080,852
VARIABLE STROKE ACTUATOR
Howard M. Geyer, Dayton, Ohio, assignor to General Motors Corporation, Detroit, Mich., a corporation of Delaware
Filed Aug. 3, 1961, Ser. No. 128,988
10 Claims. (Cl. 121—38)

This invention pertains to a fluid pressure operated actuator, and particularly to a linear actuator having variable stroke limiting means.

Heretofore, linear actuators have been designed embodying mechanical stroke limiting means but, for the most part, the stroke limiting positions were predetermined and could not be adjusted during actuator operation. The present invention relates to a fluid pressure differential operated linear actuator of the piston and cylinder type wherein the stroke of the actuator can be infinitely varied by an auxiliary servo motor so as to effectively control the stroke of the piston to the desired range and, in addition, provide adjustable stop means having friction locking means which automatically prevent retracting movement of the actuator piston under an external compression load. Accordingly, among my objects are the provision of a fluid pressure differential operated linear actuator of the piston and cylinder type including adjustable stroke limiting means; and the further provision of a linear actuator of the piston and cylinder type including auxiliary servo motor operated stop means for adjusting the stroke of the piston.

The aforementioned and other objects are accomplished in the present invention by utilizing a relatively rotatable screw and nut assembly as the adjustable stop means. Specifically, the actuator comprises a cylinder having a reciprocable piston therein capable of fluid pressure differential movement in the opposite direction. The piston is formed with an integral hollow rod which is suitably coupled to a load so as to prevent relative rotation between the piston and the cylinder. The piston carries a nut having threaded engagement with a low lead irreversible hollow screw shaft coaxially disposed within the hollow piston rod. The hollow screw shaft has a straight spline connection with a coaxially mounted rotatable shaft, the shaft being connected by suitable gearing to a reversible electric motor.

The hollow screw shaft has an enlarged flange adjacent its inboard end which is engageable with the end wall of the cylinder, and when the flange is engaged with the end wall of the cylinder, rotation of the screw shaft under load is precluded by friction braking. The reversible electric motor does not have sufficient torque output to reciprocate the piston under load.

During fluid pressure differential operation of the actuator, the screw shaft moves as a unit with the piston and nut assembly. When the piston is in a position relative to the cylinder other than its fully retracted position, the reversible electric motor can be energized to rotate the drive shaft and hence the screw shaft relative to the piston and nut assembly. Rotation of the hollow screw shaft is accompanied by axial movement thereof until the flange on the hollow screw shaft frictionally engages the end wall of the cylinder. When so positioned, the screw shaft constitutes a stop which determines the inboard, or retracted, stroke end position of the piston since frictional engagement between the screw shaft flange and the end of the cylinder precludes rotation of the screw shaft relative to the cylinder under compression loading. It will be apparent that the internal hollow screw can be located in an infinite number of positions relative to the piston and thus constitutes a variable stop limiting the stroke of the piston in the retract direction.

Further objects and advantages of the present invention will be apparent from the following description, reference being had to the accompanying drawings, wherein a preferred embodiment of the present invention is clearly shown.

Figure 1:
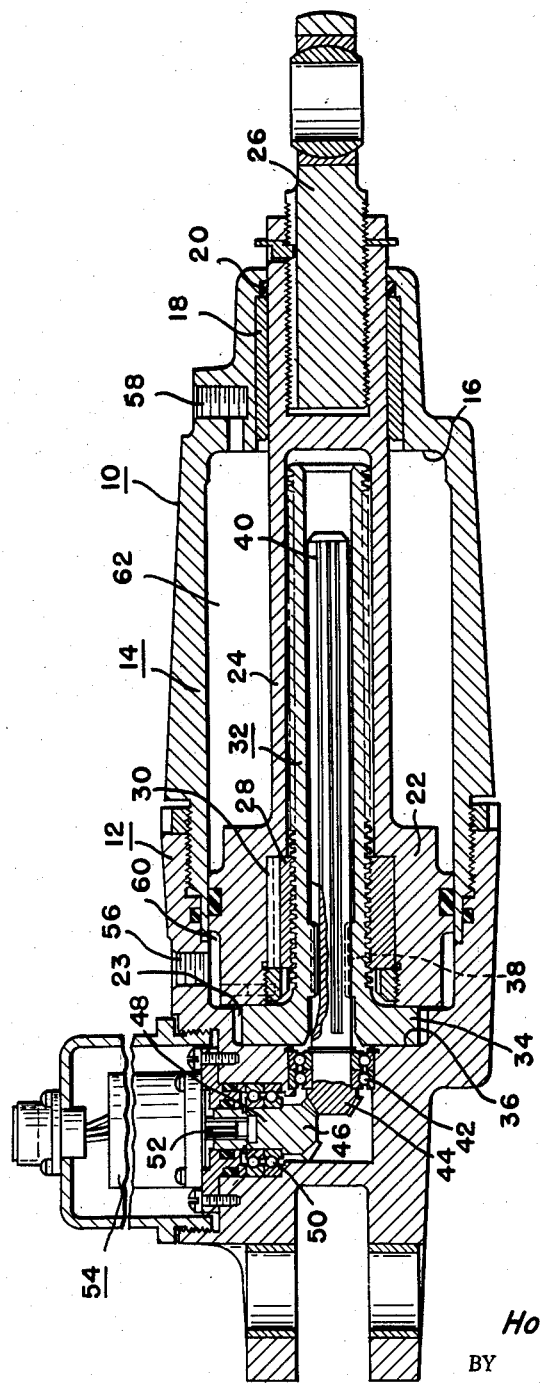
FIGURE 1 is a fragmentary sectional view of the actuator constructed according to the present invention showing the actuator in the fully retracted position.

With reference to FIGURE 1, the improved actuator assembly comprises a pair of telescopically arranged threadedly interconnected cup-shaped members 10 and 12 which form a cylinder 14. The member 10 forms the outboard end 16 of the cylinder and has a centrally arranged through bore carrying a bushing 18 and an O-ring seal 20. The cylinder 14 contains a reciprocable piston 22 having an integral axially extending hollow rod 24 which is slidably supported by the bushing 18 and is threadedly connected to a rod 26 adapted for attachment to a suitable load device, not shown. The piston 22 carries a nut 28 which is keyed thereto as indicated by numeral 30 so as to be restrained against rotation relative to the piston 22. The nut 28 threadedly engages a low lead irreversible hollow screw shaft 32 which extends coaxially into the hollow piston rod 24. The hollow screw shaft 32 has an enlarged flange 34 adjacent its inboard end, the flange 34 being engageable with the end wall 36 of the cylinder 14. In addition, the hollow screw shaft 32 has an internal straight spline connection 38 with an externally splined shaft 40 journalled within the member 12 by ball bearing assembly 42. The shaft 40 is formed with an integral bevel gear 44 and meshes with a bevel gear 46 integral with a stub shaft 48 supported by a ball bearing assembly 50. The stub shaft 48 is spline connected at 52 to the output shaft of a reversible electric motor 54.

The cylinder member 12 is formed with an extend port 56, and the cylinder member 10 is formed with a retract port 58, the ports 56 and 58 connecting with extend and retract chambers 60 and 62, respectively, on opposite sides of the piston 22. Accordingly, the piston 22 is capable of fluid pressure differential movement in opposite directions between its fully extended and fully retracted positions, the fully retracted position being depicted in FIGURE 1. In the fully extended position the piston 22 engages the end wall of the member 10. During reciprocation of the piston, the hollow screw shaft 32 moves axially with the piston, which movement is permitted by the straight spline connection 38 between the screw shaft 32 and the shaft 40.

Figure 2:
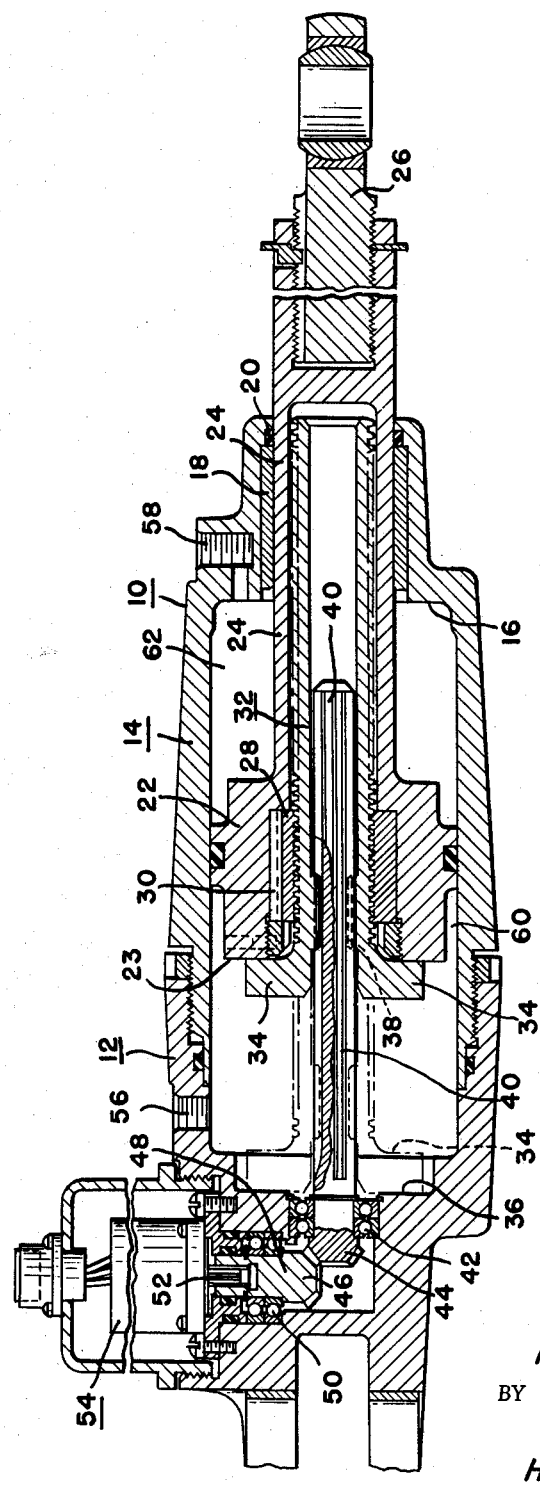
FIGURE 2 is a view similar to FIGURE 1 showing the actuator in an intermediate position with the adjustable limit stop shown in full lines and in phantom.

Thus, with reference to FIGURE 2, it can be seen that when extend chamber 60 is pressurized and retract chamber 62 is connected to drain, the piston 22 will move to the right carrying with it the screw shaft 32. As long as the flange 34 of the screw shaft 32 is maintained in engagement with the head 23 of the piston 22, the stroke of the actuator will be determined by the length of the cylinder bore. That is, the fully retracted position of the piston 22 is determined by engagement of the flange 34 with the end wall 36 when the flange abuts the head 23 of the piston, while the fully extended position is determined by engagement of the piston 22 with the end wall 16.

When the piston 22 is in any intermediate position, such as shown in FIGURE 2, the reversible electric motor 54 can be energized to rotate the shaft 40 and thus rotate the screw shaft 32 and effect axial movement thereof relative to the piston 22. When the flange 34 of the screw shaft 32 is axially displaced from the head 23 of the piston 22, the retracted stop position of the piston 22 will be determined by engagement of the flange 34 with the end wall 36 of the cylinder irrespective of the position of the piston 22 within the cylinder. This will occur since when the flange 34 engages the end wall 36 (as indicated in phantom in FIGURE 2), movement of the piston 22 to the left will be precluded due to engagement between the flange 34 and the end wall 36. The frictional engagement between the flange 34 and the end wall 36 in effect constitutes a plain bearing lock which prevents rotation of the screw shaft 32 relative to the cylinder under compression loads or under pressure in the retract chamber 62.

Obviously, if desired, the piston 22 can be held in the fully extended position since the screw shaft 32 is of sufficient length such that the flange 34 can be moved into engagement with the end wall 36 of the cylinder when the piston 22 engages the end wall 16 of the cylinder member 10. The reversible electric motor 54 does not have sufficient power to rotate the screw shaft 32 and impart reciprocation to the piston 22 under any load conditions. However, the screw shaft 32 can always be rotated and moved axially relative to the piston by the electric motor 54, and in this manner the flange 34 can be positioned to constitute a stop which determines the retracted position of the piston in an infinite number of positions throughout its normal stroke length and including the fully extended position.

While the embodiment of the invention as herein disclosed constitutes a preferred form, it is to be understood that other forms might be adopted.

What is claimed is as follows:

1. An actuator assembly including, a cylinder, a reciprocable piston disposed in said cylinder capable of fluid pressure differential movement in opposite directions, a stop member normally connected for movement with said piston but capable of axial movement relative thereto, and means operative to displace the stop member axially relative to the piston so as to limit movement of said piston in one direction.

2. An actuator assembly including, a cylinder having a reciprocable piston therein capable of fluid pressure differential movement in opposite directions, a stop member having operative threaded engagement with said piston and normally connected for movement therewith, and means operable to rotate said stop member relative to said piston and simultaneously effect axial movement of said stop member so as to limit movement of said piston in one direction.

3. An actuator assembly including, a cylinder having a reciprocable piston therein, a stop member having operative threaded engagement with said piston and normally connected for movement therewith, said stop member being capable of axial movement relative to the piston into engagement with an end wall of said cylinder, and means engageable with said stop member for imparting rotation thereto relative to the piston so as to move said stop member into engagement with the end wall of said cylinder and thereby limit the stroke of said piston in one direction.

4. An actuator assembly including, a cylinder having a reciprocable piston therein, a nut rigidly connected to said piston, an irreversible screw shaft threadedly engaging said nut and constituting a stop member, said screw shaft being normally connected for movement with said piston but capable of axial movement relative to said piston, and means operatively connected to said screw shaft for effecting rotation thereof and simultaneously effect axial movement of said screw shaft relative to said piston so as to limit movement of said piston in one direction.

5. An actuator assembly including, a cylinder having a reciprocable piston therein with a hollow piston rod extending therefrom, a hollow screw shaft having operatively threaded engagement with said piston and coaxially disposed within said hollow piston rod, said hollow screw shaft constituting a stop member normally connected for movement with said piston but capable of axial movement relative to said piston, and means operatively connected to said screw shaft for rotating the same to displace said screw shaft axially relative to said piston so as to limit movement of said piston in one direction.

6. An actuator assembly including, a cylinder having a reciprocable piston therein with an axially extending hollow piston rod, a nut rigidly attached to said piston for movement therewith, a hollow screw shaft threadedly connected with said nut and extending into said hollow piston rod, said screw shaft having an enlarged flange adjacent its inner end engageable with an end of said cylinder so as to limit movement of said piston in one direction, and means operable to rotate said screw shaft relative to said piston and nut to displace the screw shaft axially relative to said piston and nut and thereby limit the stroke of said piston in said one direction.

7. An actuator assembly including, a cylinder having a reciprocable piston disposed therein with an axially extending hollow piston rod, a nut rigidly attached to said piston for movement therewith, a hollow screw shaft coaxially disposed within said cylinder and threadedly engaging said nut, said screw shaft having an enlarged flange adjacent its inboard end constituting a stop engageable with the end of said cylinder for limiting movement of said piston in one direction, said screw shaft being normally movable with said piston but capable of axial displacement relative to said piston upon rotation thereof, and means operable to rotate said screw shaft and displace the same relative to said piston so as to displace the same relative to said piston so as to vary the stroke of said actuator in said one direction.

8. The actuator assembly set forth in claim 7 wherein said last recited means comprises a reversible electric motor.

9. The actuator assembly set forth in claim 7 including a rotatable drive shaft coaxially disposed within said hollow screw shaft and having a straight spline connection therewith so as to permit axial movement of said screw shaft with said piston.

10. The actuator assembly set forth in claim 9 wherein the means for imparting rotation to said screw shaft includes a reversible electric motor having a driving connection with said drive shaft.

References Cited in the file of this patent
UNITED STATES PATENTS
3,003,470     Geyer _____ Oct. 10, 1961